Feb. 3, 1959

C. M. SMITH 2,872,551

ELECTRIC WIRING DEVICE

Filed Dec. 27, 1956

WITNESSES

INVENTOR
Clarence M. Smith
BY
ATTORNEY

Feb. 3, 1959    C. M. SMITH    2,872,551
ELECTRIC WIRING DEVICE
Filed Dec. 27, 1956    2 Sheets-Sheet 2

2,872,551

ELECTRIC WIRING DEVICE

Clarence M. Smith, Trumbull, Conn., assignor to Westinghouse Electric Corporation, East Pittsburgh, Pa., a corporation of Pennsylvania Application December 27, 1956, Serial No. 630,839

13 Claims. (Cl. 200—172)

This invention relates generally to electric wiring devices and more particularly to indexing means for electric wiring devices such as switches.

In the operation of electric switches it is desirable that an indication of energizing and deenergizing of such switches be made by some simple, appropriate indexing device. It would also be desirable if the indexing device also inherently aids in causing the operation of the switch to be noiseless. Prior attempts to construct indexing devices for electric switches which inherently aid in causing the operation of the switch to be noiseless have resulted in devices that are complex in construction necessitating many parts, and causing relatively complex and expensive assembly methods.

Accordingly, one object of this invention is to provide an electric switch having a simple indexing means of novel construction.

Another object of this invention is to provide an electric switch having a simple indexing means of novel construction, whereby said indexing means inherently aids in causing the operation of the switch to be noiseless.

A further object of this invention is to provide an electric switch having a novel and convenient indexing means which acts to form stops for the switch handle.

Still another object of this invention is to provide an electric switch having a one-piece indexing means which cooperates with the yoke of the switch to provide indexing of the switch and which also cooperates with the yoke of the switch to aid in noiseless operation of the switch.

These and other objects of this invention will become more apparent upon the reading of the following detailed description of one embodiment thereof, with reference to the attached drawings in which.

In the illustrative form of the invention shown in Figs. 1 to 5, the switch is provided with an elongated cup-shaped casing 3 of insulating material, preferably a molded insulating material, with the casing having an open front. The open front of the casing 3 is adapted to be covered by a yoke 5, which may be of metal, and which is secured to the casing, for example, by screws 7 which pass through suitable openings of the yoke 5, and are threadedly engaged in openings 9 provided in the casing 3.

Figure 5:
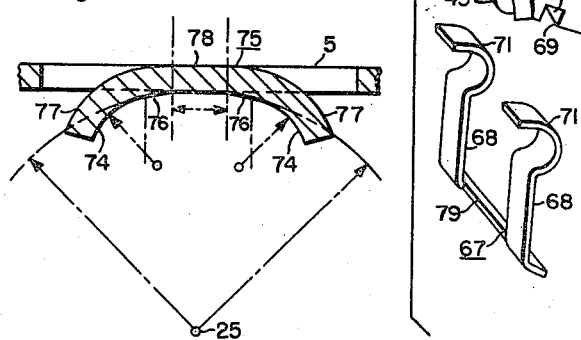
Fig. 5 is an enlarged view of the curvature of integral sections of the yoke of the switch shown in Figs. 1, 2, 3 and 4.

The yoke 5 is provided with a centrally located, longitudinally extending slot 11 for receiving an operating handle 13, preferably of insulating material, such for example as the same type of material used for the casing 3. The slot 11 in the yoke 5 is provided with two integral sections 75 located at and extending longitudinally of both sides of the slot 11 and partially cut away at opposite ends 77 from the yoke 5. Referring to Fig. 5, the sections 75 of the yoke 5 have a flat region 78 located in the center thereof and portions 76 of the partially cut-away ends 77 in the proximity of the flat region 78 which are slightly curved inwardly at a curvature having a radius equal to the distance from the pivot point 25 of the contact strip 21, to be described later, to an edge of the flat region 78. The extremities 74 of the partially cut-away ends 77 are also curved inwardly at approximately three and one-half times the curvature of the portions 76. The utility and importance of these curvatures will be discussed later in the description.

The yoke 5 is provided also with extensions 15 at each end thereof which may be provided with suitable openings 17 for mounting a switch on a support. The right end of the casing 3 is also open, except for a centrally located end barrier 19 which is formed as an integral part of the casing 3. The end barrier 19 is of less width than the casing 3 so that end openings are provided at each side of the barrier 19.

Within the casing 3 there is provided one contact strip 21 of a good electrical conducting material, such for example as brass. The contact strip 21 is located along one side of the casing 3 in engagement therewith. A second similar contact strip, not shown on the drawings, extends longitudinally along the casing 3 at the opposite side wall thereof. The inner ends of the contact strips are adapted to be supported by an integral ledge, such as the ledge 23 formed with the casing, and the contact strips extend from these ledges longitudinally of the casing and through the openings in the opposite end of the switch casing 3 at opposite sides of the barrier 19, respectively. Each of the contact strips is provided with a struck-out rounded projection, such as the projection portion 25 on contact strip 21 which extends inwardly of the casing at substantially the mid point of the casing, and which are adapted to be received, respectively, in rounded pivot recesses at opposite sides of a switch button 27. The switch button 27 may be a well-known construction, for example, a mercury switch button, and it includes opposite cup-shaped members 29 of electrical conducting material having their open faces joined by a partition of insulating material 31, such for example, as a ceramic insulating material. The interior of the button 27 on both sides of the partition 31 is partially filled with a good electrical conducting liquid, such as mercury 33. The partition 31 has an opening 35 therein, so that at one rotative position of the button 27, the liquid at opposite sides of the partition 31 in contact with the metal cups 29, respectively, is in communication so as to complete an electric circuit between the metal cups 29.

The bottom wall of casing 3 is provided with laterally spaced integral projections 37 symmetrically positioned on opposite sides of button 27, and having curved outer ends to conform to the curvatures of the metal cups 29. The switch handle 13 has an enlarged base 39 which has a centrally located longitudinally extending slot 81 for receiving the projecting part of the insulating partition 31 of the button 27. The base 39 of the handle 13 is also provided with integral lateral flanges 41 which extend longitudinally on opposite sides thereof to engage the metal cups 29 of the button 27, with at least one of such flanges 41 having a key projection 43 thereon adapted to be received in a recess 45 provided on the corresponding metal cup 29 of the button 27, for the purpose of locating the handle for rotation of the button 27.

Each of the contact strips is provided exteriorly of the casing 3 with a terminal portion 47 which extends laterally of the strip, and is located at an acute angle relative to the front surface of the switch. Each terminal portion 47 is provided with an opening for receiving a terminal screw 49 which is threadedly engaged with a nut 51 located beneath each terminal portion 47. Each nut 51 is curved in section, and secured to its screw, for example, as by staking the inner end thereof. The front edge of each terminal is bent inwardly at 53, and the inner edge of each terminal portion 47 is adapted to be received in a groove provided in extension 55 of the bottom portion of the casing. The casing extension 55 has openings at opposite sides of the barrier 19 which are adapted to be covered by the terminal portions 47, as they are located in the same plane as the terminal portions, with one side 57 of each opening formed to support the inner edge of its terminal portion 47. Beneath each terminal portion 47, the casing extension 55 is provided with a conductor receiving opening 59 which is located in a plane at right angles to the plane of its terminal portion 47. The front edges of the terminal portions 47 are secured in postion by a retaining plate 61 located between the bent front edges 63 of the terminal portions 47 and the yoke 5 so that when the latter is secured in position, the retaining plate 61 will act to retain the terminal portions 47 at their operative positions shown. The inner edge of the retaining plate 61 has a central extension 65 located in a recess provided in the casing 3, and opposite side edges of retaining plate 61 are adapted to be located in spaces 66 provided between the barrier 19 and the adjacent ends of the casing side walls.

It will be apparent from the description thus far, that the switch button 27 is rotatively mounted at opposite sides on the contact strips, respectively, and is also supported by the casing projections 37, so that it can be moved by the operating handle 13 between two extreme rotative positions at which the circuit is open and closed, respectively, between the metal cups 29 of the button 27. It will also be observed that the terminal portions 47 are provided at an exposed location at one end of the switch, at an acute angle to the front face of the switch. The particular construction and functioning of the terminal portions 47 and their cooperation with the structure illustrated, does not form a part of this invention, but instead is more particularly described and claimed in the copending application of Owen L. Taylor, on Electric Wiring Devices, Serial No. 630,843 filed concurrently with this application, and assigned to the same assignee as this invention.

The base 39 of the handle 13 is also provided with a notch 69 in which can be located the bight of a generally U-shaped leaf spring 67, of a resilient material, such for example as spring steel. The leaf spring 67 is comprised of a bight 79 and two parallel arms 68 extending laterally from opposite ends of the bight 79 and at an acute angle thereto. The arms 68 have curved ends 71 and are spaced apart to receive the base 39 of the handle 13 so as to engage the flanges 41 at opposite sides of the handle 13. The angle between the bight 79 and the arms 68 of the spring 67, and the curvature of the ends 71 of the spring are so made as to extend beyond the projection 73 of the flange 41 when the bight 79 of the spring 67 is inserted in the notch 69 of the handle 13. When assembled, stress is placed on each arm 68 of the spring 67 by engagement of an intermediate portion of one side of each spring arm 68 with the corresponding flange 41, and by engagement of the other side of each spring arm 68 with the integral sections 75 of the yoke 5 at the curved ends 71 of the spring arms 68, and further, by engagement of the bight portions 79 of the spring with the inner surface 70 of the notch 69.

Figure 1:
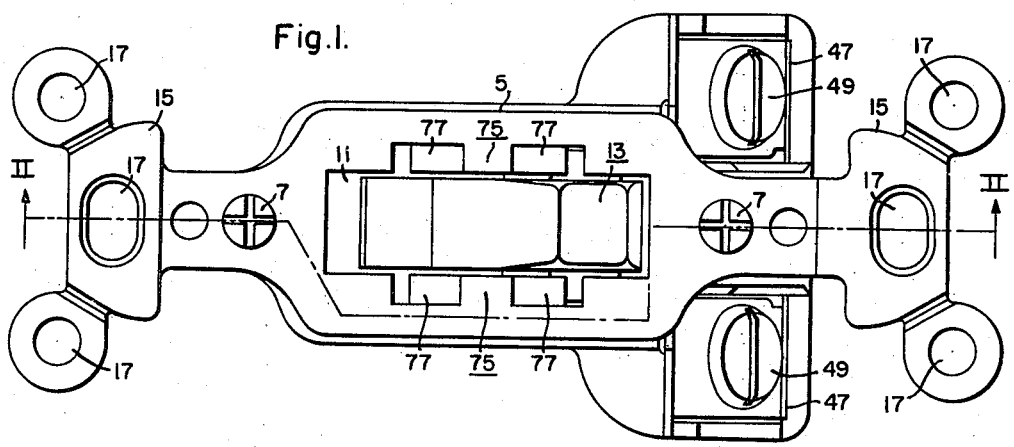
Figure 1 is a top plan view of a switch constructed in accordance with this invention.
Figure 2:
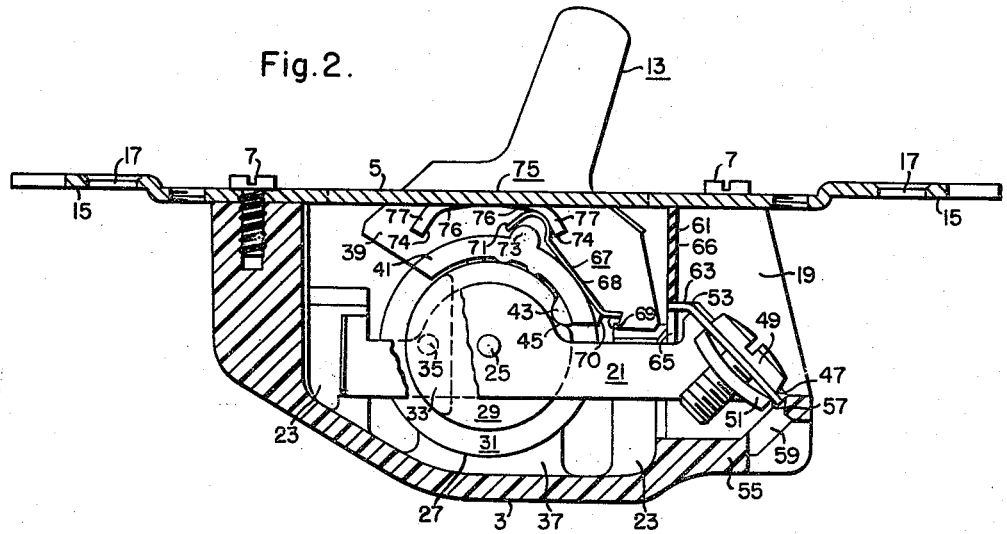
Fig. 2 is a longitudinal sectional view of the switch illustrated in Fig. 1, taken substantially along the line II—II of Fig. 1 and illustrative of the switch in the "on" position.
Figure 3:
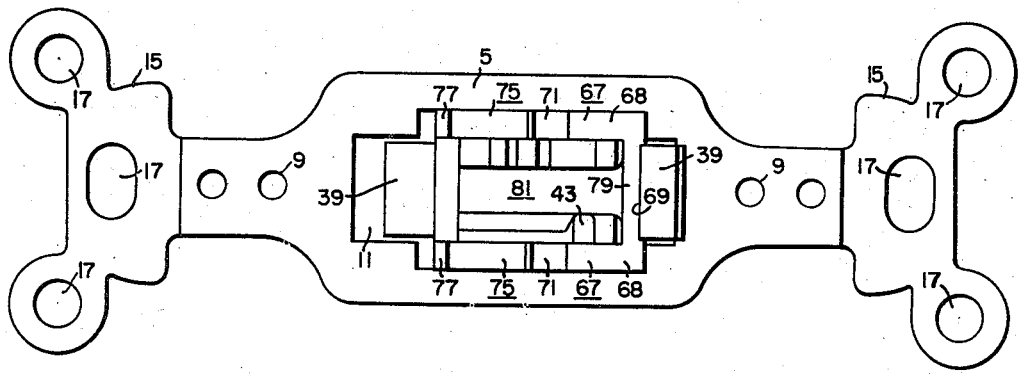
Fig. 3 is substantially a bottom plan view of the switch shown in Figs. 1 and 2 with the casing and circuit opening and closing means removed.
Figure 4:
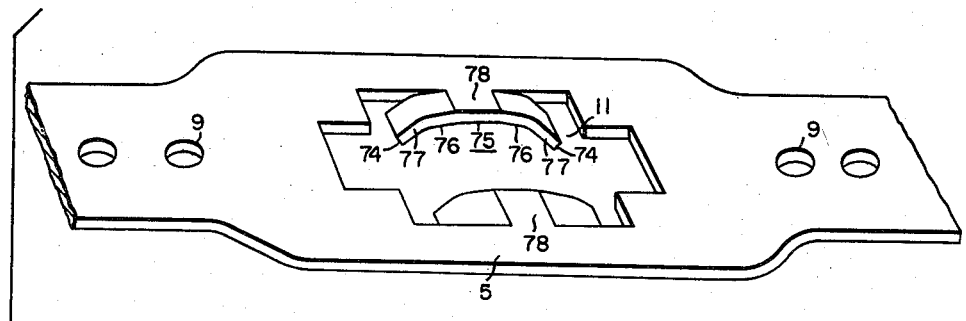
Fig. 4 is an enlarged, perspective, exploded view of the components of the switch shown in Fig. 3.
Figure 4:
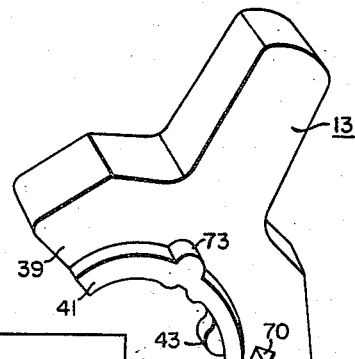

The arms 68 of the spring 67 are constructed of such length that when the handle 13 is rotated to an extreme position, the curved ends 71 of the spring 67 are in engagement with the extreme portions 74, respectively, of the integral sections 75 of the yoke 5. It is apparent that the stress in the spring 67 is proportional to the radial distance between the flanges 41 and the integral sections 75, respectively, measured along a radius from pivot point 25 which passes through the point of engagement of the spring ends 71 and the integral sections 75. The integral sections 75 are so constructed as to have a flat region 78 at their centers, partially cut-away ends 77 comprising inwardly projecting slightly curved portions 76, terminating in more sharply curved extremities 74, whereby the curvature of the end portions 76 in the proximity of the flat central region is less than the curvature of the extremities 74 of the partially cut-away ends 76. It can, therefore, be seen that the stress in the spring 67 is increased when the curved ends 71 of the spring arms 68 are, respectively, in contact with the flat central regions of the integral sections 75, and that the stress in the spring 67 is also increased when the curved ends 71 are moved into engagement with each of the extremities 74 of the partially cut-away ends 77 of the integral sections 75, respectively. As the switch handle 13 it rotated from one extreme position to the other, the stress in the spring arm 68 is decreased as the curved ends 71 of the spring arms 68 approach the flat central region of the integral section 75, is increased as the curved ends 71 engage the flat central regions 73 of the integral sections 75, is decreased as the curved ends 71 engage the other end sections 77 on the other side of the flat central region, and finally the stress is increased again as the curved ends 71 engage the other extremities 74. When the handle 13, in the extreme position of its rotation, is released by the operator, the curved ends 71 of the spring 67, being in engagement with the extremities 74 of the integral sections 75, respectively, will have a force acting upon them inwardly along a circumference of the inner edge of the sections 75 such that the handle will move inwardly of the casing until the ends 71 are in engagement with the slightly curved portions 76, respectively, causing the normal rest position of the handle to be a position where ends 71 of the spring 67 are in engagement with the slightly curved portions 76, respectively, adjacent the extremities 74 as shown in Fig. 2.

Resilient stopping of the handle 13 at the end of its movement is provided by engagement of the curved ends 71 of the spring 67 with the extremities 74 of the integral sections 75. Positive stopping of the rotation of the handle 13 is also provided when overtravel of handle 13 causes the tips of curved ends 71 to come into contact with the top surfaces of the flanges 41, respectively. Because of an increase in the tension of the spring 67, it should be observed that the switch handle normally comes to a stop without having the tips of the curved ends 71 of the spring 67 and the upper latter surfaces of the integral flanges 41 come into contact, and thereby a noiseless operation of the switch is achieved.

When the switch handle is at rest at one extreme position, the curved ends 71 of the spring 67 are in engagement with the slightly curved portion 76 of the integral sections 75 of the yoke 5 adjacent the corresponding extremity 74. In moving the switch handle to the other extreme position, the operator will feel an increase in resistance and rotation of the handle when the curved spring ends 71 come into engagement with the flat central region 78 of the integral section 75. This resistance to motion will increase until the curved spring ends 71 are at the center of the flat region 78, and when the center thereof is passed, the motion of the switch handle will be aided by forces acting in the direction of motion of the handle. These forces diminish as the curved spring ends 71 move further away from the center of the flat regions 78 and are substantially zero when the curved spring ends engage slightly curved portions 76 on the opposite sides of the flat regions 78 as these portions are preferably curved on an arc having its center at the pivot 25 (Fig. 5). The indexing spring 67 therefore acts as an overcenter type of spring and gives the operator a feeling of engagement and disengagement of the switch as the switch handle is rotated.

Having described a preferred embodiment of this invention in accordance with the patent statutes, it should be understood that the particular structure specifically described herein is only illustrative of the invention, and that it will be obvious to persons skilled in the art that many changes and modifications will be made in this particular device, without departing from the broad spirit and scope of the invention. Accordingly, it is desired that the invention be broadly interpreted in the spirit of the following claims.

I claim as my invention:

1. A switch comprising, a support member, circuit opening and closing means mounted on said support member, an operating handle member movably mounted on said support member for operating said circuit opening and closing means, indexing means comprising portions on said support and handle members, respectively, one of which comprises a resilient member which is biased into engagement with the other throughout movement of said handle member, the other of said portions comprising a rigid surface having its end extremities abruptly approaching said one portion, and rigid means located adjacent said one portion to wedge said one portion between said rigid means and said end extremities to form a positive stop for the handle member at its extreme positions.

2. A switch comprising, a support member, circuit opening and closing means mounted on said support member, an operating handle member movably mounted on said support member for operating said circuit opening and closing means, indexing means comprising portions on said support and handle members, respectively, one of which is a leaf type indexing spring mounted on said handle member and biased into engagement with the other throughout movement of the said handle member, the other of said portions comprising a surface on said support member having an intermediate portion located closer to said one portion than its adjacent parts to exert additional stress on said one portion at a corresponding intermediate point in the path of travel of said handle member, said surface at each adjacent side of said intermediate portion receding from said one portion and having its end extremities more abruptly approaching said one portion to form a resilient stop for the handle member at its extreme positions.

3. A switch comprising, a support of insulating material, a yoke at least adjacent to one side of said support secured thereto and having an opening therein, at least one circuit opening and closing means mounted on said support, a handle having an enlarged base movably mounted on said support to operate said circuit opening and closing means and having a portion of said handle projecting through said opening in said yoke, and resilient cantilever indexing means having one end thereof mounted on said handle and the other end engaging said yoke in a plane parallel to the plane of motion of said handle to perform an indexing action for said handle.

4. A switch comprising, a cup-shaped casing of insulating material, a rigid yoke mounted on said casing having a substantially flat portion located to extend over at least a portion of the open side thereof, at least one circuit opening and closing means mounted within said casing, a handle having an enlarged base and movably mounted on said casing to operate said circuit opening and closing means and having a portion of said handle projecting through an opening in said yoke, spaced electrical conducting strips mounted in said casing and located to conduct current to said circuit opening and closing means, terminal means connected to said electrical conducting strips, respectively, and resilient indexing means mounted on said handle engaging said portion of said yoke in a plane parallel to the plane of motion of said handle to perform an indexing action for said handle.

5. A switch comprising, a cup-shaped casing of insulating material, a rigid yoke mounted on said casing having a substantially flat portion located to extend over at least a portion of the open side thereof and having an elongated slot located therein, a pair of integral inwardly extending rigid stop portions located adjacent to and spaced along at least one of the longitudinal sides of said slot in said yoke with a part of said flat portion therebetween, at least one circuit opening and closing means mounted within said casing, a handle having an enlarged base and movably mounted on said casing to operate said circuit opening and closing means and having a portion of said handle projecting through said slot in said yoke, spaced electrical conducting strips mounted in said casing and located to conduct current to said circuit opening and closing means, terminal means connected to said electrical conducting strips, respectively, resiliently biased indexing means mounted on said handle located to engage said stop portions of said yoke and the portion of the yoke therebetween to perform an indexing action for said handle.

6. A switch comprising, a cup-shaped casing of insulating material, a yoke mounted on said casing to extend over at least a portion of the open side thereof and having an elongated slot located in said yoke, a pair of integral arcuately shaped inward end portions located adjacent to and extending along spaced portions of each of the longitudinal sides of said slot in said yoke and each pair connected together by a centrally located, flat, intermediate portion on each of the longitudinal sides of said slot, at least one circuit opening and closing means mounted within said casing, a handle having an elongated base and movably mounted on said casing and having a portion of said handle projecting through said slot and said yoke to operate said circuit opening and closing means, a generally U-shaped indexing spring having a bight and two parallel arms, a notch laterally across the base of said handle to receive said bight of said indexing spring, lateral integral flanges extending longitudinally of said base of said handle to engage intermediate portions of said arms of said indexing spring, spaced electrical conducting strips mounted in said casing and located to conduct current to said circuit opening and closing means, terminal means connected to said electrical conducting strips, respectively, said arms of said indexing spring having end portions thereof engaging said integral sections of said yoke to perform an indexing action for said handle.

7. A switch comprising, a support of insulating material, a yoke at least adjacent to one side of said support having an elongated slot therein, a pair of integral arcuately shaped inward end portions located adjacent to and extending along spaced portions of each of the longitudinal sides of said slot in said yoke and each pair connected together by a centrally located, flat, intermediate portion on each of the longitudinal sides of said slot, circuit opening and closing means mounted on said support, a handle having an elongated base and movably mounted on said support having at least a portion of said handle projecting through said slot of said yoke to operate said circuit opening and closing means, a generally U-shaped indexing spring having a bight and two parallel arms, a notch laterally across the base of said handle to receive said bight of said indexing spring, lateral integral flanges extending longitudinally of said base of said handle to engage intermediate portions of said arms of said indexing spring, spaced electrical conducting strips mounted in said support and located to conduct current to said circuit opening and closing means, terminal means connected to said electrical conducting strips, respectively, said arms of said indexing spring having end portions thereof engaging said integral sections of said yoke to perform an indexing action for said handle.

8. A switch comprising, a cup-shaped casing of insulating material, a yoke mounted on said casing to extend over at least a portion of the open side thereof, at least one circuit opening and closing means mounted within said casing, a handle having an enlarged base and movably mounted on said casing to operate said circuit opening and closing means and having a portion of said handle projecting through an opening in said yoke, a generally U-shaped indexing spring having a bight and two parallel arms, a notch laterally across the base of said handle to receive said bight of said indexing spring, lateral integral flanges extending longitudinally of said base of said handle to engage intermediate portions of said arms of said indexing spring, spaced electrical conducting strips mounted within said casing and located to conduct current to said circuit opening and closing means, terminal means connected to said electrical conducting strips, respectively, said arms of said indexing spring having end portions thereof engaging said yoke in a plane parallel to the plane of motion of said handle to perform an indexing action for said handle.

9. A switch comprising, a support of insulating material, a yoke at least adjacent to one side of said support, and secured thereto, at least one circuit opening and closing means mounted within said support, a handle having an enlarged base and movably mounted on said support to operate said circuit opening and closing means and having a portion of said handle projecting through an opening in said yoke, a generally U-shaped indexing spring having a bight and two parallel arms, a notch laterally across the base of said handle to receive said bight of said indexing spring, lateral integral flanges extending longitudinally of said base of said handle to engage intermediate portions of said arms of said indexing spring, spaced electrical conducting strips mounted within said support and located to conduct current to said circuit opening and closing means, terminal means connected to said electrical conducting strips, respectively, said arms of said indexing spring having end portions thereof engaging said yoke in a plane parallel to the plane of motion of said handle to perform an indexing action for said handle.

10. A switch comprising, a cup-shaped casing of insulating material, a yoke mounted on said casing to extend over at least a portion of the open side thereof and having an elongated slot located in said yoke, a pair of integral arcuately shaped inward end portions located adjacent to and extending along spaced portions of each of the longitudinal sides of said slot in said yoke and each pair connected together by a centrally located, flat, intermediate portion on each of the longitudinal sides of said slot, at least one circuit opening and closing means mounted within said casing, a handle having an elongated base and movably mounted on said casing and having a portion of said handle projecting through said slot and said yoke to operate said circuit opening and closing means, a generally U-shaped indexing spring having a bight and two parallel arms, a notch laterally across the base of said handle to receive said bight of said indexing spring, lateral integral flanges extending longitudinally of said base of said handle to engage intermediate portions of said arms of said indexing spring, spaced electrical conducting strips mounted in said casing and located to conduct current to said circuit opening and closing means, terminal means connected to said electrical conducting strips, respectively, said arms of said indexing spring having end portions thereof engaging said integral sections of said yoke, said arcuately shaped sections having said intermediate flat portion located closer to said lateral flange of said handle than said arcuately shaped adjacent end portions to exert additional stress on said spring arm at a corresponding intermediate point in the path of travel of said handle, said end portions adjacent to said intermediate flat portion curved to recede from said lateral flange and having its end extremities curved to more abruptly approach said lateral flange to form a resilient stop for said handle at its extreme positions.

11. A switch comprising, a support of insulating material, a yoke at least adjacent to one side of said support having an elongated slot therein, a pair of integral arcuately shaped inward end portions located adjacent to and extending along spaced portions of each of the longitudinal sides of said slot in said yoke and each pair connected together by a centrally located, flat, intermediate portion on each of the longitudinal sides of said slot, circuit opening and closing means mounted within said support, a handle having an elongated base and movably mounted on said support having at least a portion of said handle projecting through said slot of said yoke to operate said circuit opening and closing means, a generally U-shaped indexing spring having a bight and two parallel arms, a notch laterally across the base of said handle to receive said bight of said indexing spring, lateral integral flanges extending longitudinally of said base of said handle to engage intermediate portions of said arms of said indexing spring, spaced electrical conducting strips mounted in said support and located to conduct current to said circuit opening and closing means, terminal means connected to said electrical conducting strips, respectively, said arms of said indexing spring having end portions thereof engaging said integral sections of said yoke, said arcuately shaped sections having said intermediate flat portion located closer to said lateral flange of said handle than said arcuately shaped adjacent end portions to exert additional stress on said spring arm at a corresponding intermediate point in the path of travel of said handle, said end portions adjacent to said intermediate flat portion curved to recede from said lateral flange and having its end extremities curved to more abruptly approach said lateral flange to form a resilient stop for said handle at its extreme positions.

12. A switch comprising, a support member, circuit opening and closing means mounted on said support member, an operating handle member movably mounted on said support member for operating said circuit opening and closing means, indexing means comprising portions on said support and handle members, respectively, one of which is a resilient leaf type indexing spring mounted on said handle member and biased into engagement with the other throughout movement of said handle member, the other of said portions comprising a surface on said support member, rigid stop means located to engage said spring when the handle is moved to its extreme positions to deflect said spring in one direction, and means located adjacent said spring to limit its deflection in the aforesaid direction to form a positive stop for said handle.

13. A switch comprising, a cup-shaped casing of insulating material, a yoke mounted on said casing to extend over at least a portion of the open side thereof, at least one circuit opening and closing means mounted within said casing, a handle having an enlarged base and movably mounted on said casing to operate said circuit opening and closing means and having a portion of said handle projecting through an opening in said yoke, an indexing leaf spring having one end secured to said base, a lateral integral flange extending longitudinally of said base of said handle to engage an intermediate portion of said indexing spring, said indexing spring having its other end engaging said yoke in a plane parallel to the plane of motion of said handle to perform an indexing action for said handle.

References Cited in the file of this patent

UNITED STATES PATENTS 2,142,153     Sambleson     Jan. 3, 1939